US009678948B2

(12) United States Patent
Bhatt

(10) Patent No.: US 9,678,948 B2
(45) Date of Patent: Jun. 13, 2017

(54) REAL-TIME MESSAGE SENTIMENT AWARENESS

(75) Inventor: Dhruv A. Bhatt, Indian Trail, NC (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/533,313

(22) Filed: Jun. 26, 2012

(65) Prior Publication Data
US 2013/0346067 A1   Dec. 26, 2013

(51) Int. Cl.
*G06F 17/27* (2006.01)
(52) U.S. Cl.
CPC .............................. *G06F 17/2785* (2013.01)
(58) Field of Classification Search
CPC ................................................ G06F 17/2785
USPC ............................................................ 704/9
See application file for complete search history.

(56) References Cited

U.S. PATENT DOCUMENTS

| | | | |
|---|---|---|---|
| 6,427,137 B2 | 7/2002 | Petrushin | |
| 6,553,385 B2 | 4/2003 | Johnson et al. | |
| 7,139,752 B2 | 11/2006 | Broder et al. | |
| 7,165,033 B1 | 1/2007 | Liberman | |
| 7,185,065 B1 * | 2/2007 | Holtzman et al. | 709/217 |
| 7,428,554 B1 | 9/2008 | Coberley et al. | |
| 7,512,602 B2 | 3/2009 | Broder et al. | |
| 7,523,085 B2 * | 4/2009 | Nigam et al. | 706/55 |
| 7,558,778 B2 | 7/2009 | Carus et al. | |
| 7,565,404 B2 | 7/2009 | Gwozdz | |
| 7,640,304 B1 * | 12/2009 | Goldscheider | 709/205 |
| 7,810,033 B2 | 10/2010 | Cordes et al. | |
| 7,822,701 B2 | 10/2010 | Carter et al. | |
| 7,987,188 B2 | 7/2011 | Neylon et al. | |
| 7,996,210 B2 | 8/2011 | Godbole et al. | |
| 8,010,539 B2 | 8/2011 | Blair-Goldensohn et al. | |
| 8,041,669 B2 * | 10/2011 | Nigam et al. | 706/55 |
| 8,086,409 B2 | 12/2011 | Anastassiou et al. | |
| 8,694,357 B2 | 4/2014 | Ting et al. | |

(Continued)

FOREIGN PATENT DOCUMENTS

| | | | |
|---|---|---|---|
| CN | 102385858 | 3/2013 | |
| EP | 0287310 A2 * | 10/1988 | ....... G06F 17/30401 |
| JP | 2004030093 | 1/2004 | |

OTHER PUBLICATIONS

Min et al, "Detecting and Blocking False Sentiment Propagation." International Joint Conference on National Language Processing. 2011.*

(Continued)

*Primary Examiner* — Lamont Spooner
*Assistant Examiner* — Oluwadamilola M Ogunbiyi
(74) *Attorney, Agent, or Firm* — Janaki K. Davda; Konrad, Raynes, Davda & Victor LLP

(57) ABSTRACT

Provided are techniques for determining a sentiment of an electronic message. The electronic message is parsed to identify one or more sub-constructs. For at least one of the sub-constructs that is not false-positive, a sentiment indicator is assigned from a set of types of sentiment indicators, and a score is assigned for the sentiment indicator. A final score is obtained for at least one type of sentiment indicator in the electronic message by summing scores for that type of sentiment indicator. Based on the final score for the at least one type of sentiment indicator, a sentiment of the electronic message is identified.

24 Claims, 7 Drawing Sheets

(56) References Cited

U.S. PATENT DOCUMENTS

| | | | |
|---|---|---|---|
| 9,224,152 B2* | 12/2015 | Gustafson | G06Q 30/02 |
| 2002/0161569 A1* | 10/2002 | Itoh | G06F 17/2836 704/2 |
| 2002/0168664 A1 | 11/2002 | Murray et al. | |
| 2003/0108241 A1 | 6/2003 | Colmenarez et al. | |
| 2004/0243556 A1 | 12/2004 | Ferrucci et al. | |
| 2004/0243645 A1 | 12/2004 | Broder et al. | |
| 2005/0078804 A1 | 4/2005 | Yomoda | |
| 2007/0054277 A1 | 3/2007 | Evans | |
| 2007/0208569 A1 | 9/2007 | Subramanian et al. | |
| 2008/0243397 A1 | 10/2008 | Peccoud et al. | |
| 2008/0249764 A1 | 10/2008 | Huang et al. | |
| 2008/0270116 A1* | 10/2008 | Godbole | G06F 17/279 704/9 |
| 2008/0294741 A1* | 11/2008 | Dos Santos et al. | 709/206 |
| 2009/0125371 A1* | 5/2009 | Neylon | G06F 17/30616 707/739 |
| 2009/0210228 A1 | 8/2009 | George | |
| 2009/0216524 A1* | 8/2009 | Skubacz et al. | 704/9 |
| 2009/0254572 A1 | 10/2009 | Redlich et al. | |
| 2009/0319342 A1* | 12/2009 | Shilman et al. | 705/10 |
| 2010/0050118 A1 | 2/2010 | Chowdhury et al. | |
| 2010/0082751 A1* | 4/2010 | Meijer et al. | 709/206 |
| 2010/0114575 A1 | 5/2010 | Itoh et al. | |
| 2010/0121707 A1 | 5/2010 | Goeldi | |
| 2010/0161746 A1 | 6/2010 | Pilgrim | |
| 2010/0169234 A1 | 7/2010 | Metzger et al. | |
| 2010/0223581 A1* | 9/2010 | Manolescu et al. | 715/853 |
| 2010/0246800 A1 | 9/2010 | Geppert et al. | |
| 2010/0312769 A1* | 12/2010 | Bailey et al. | 707/740 |
| 2010/0332287 A1 | 12/2010 | Gates et al. | |
| 2011/0144971 A1 | 6/2011 | Danielson | |
| 2011/0208522 A1 | 8/2011 | Pereg et al. | |
| 2012/0057691 A1 | 3/2012 | Moran et al. | |
| 2012/0101805 A1* | 4/2012 | Barbosa et al. | 704/9 |
| 2012/0101808 A1* | 4/2012 | Duong-Van | G06F 17/2785 704/9 |
| 2012/0102041 A1 | 4/2012 | Park et al. | |
| 2012/0102054 A1 | 4/2012 | Popescu et al. | |
| 2012/0130717 A1 | 5/2012 | Xu et al. | |
| 2012/0158989 A1* | 6/2012 | Patil et al. | 709/235 |
| 2012/0185544 A1* | 7/2012 | Chang | G06Q 50/01 709/206 |
| 2012/0215535 A1 | 8/2012 | Wasserblat et al. | |
| 2012/0246054 A1* | 9/2012 | Sastri | 705/37 |
| 2012/0290622 A1* | 11/2012 | Kumar et al. | 707/780 |
| 2013/0073571 A1 | 3/2013 | Coulet et al. | |
| 2013/0253910 A1 | 9/2013 | Turner et al. | |
| 2013/0254218 A1 | 9/2013 | Friedlander et al. | |
| 2014/0012865 A1 | 1/2014 | Bowman et al. | |
| 2014/0012866 A1 | 1/2014 | Bowman et al. | |

OTHER PUBLICATIONS

Xu Hongzhi et al, "Expanding Chinese sentiment dictionaries from large scale unlabeled corpus," PACLIC 24 Proceedings, 2010, pp. 301-310.*

Castillo Carlos et al, "Information Credibility on Twitter," Proceedings of the 20th International Conference on World Wide Web. ACM, 2011, pp. 675-684.*

International Search Report and Written Opinion for International Application No. PCT/IB2013/054851, Nov. 21, 2013, 10 pages. [57.269PCT (ISR & WO)].

Castellanos, M., R. Ghosh, Y. Lu, L. Zhang, P. Ruiz, M. Dekhil, U. Dayal, and M. Hsu, "LivePulse: Tapping Social Media for Sentiments in Real-Time", Proc of the 20th Intl Conf Companion on World Wide Web, pp. 193-196; Hyderabad, India, Mar. 28-Apr. 1, 2011, DOI: 10.1145/1963192.1963287. [Also Total 4 pp.].

U.S. Appl. No. 13/799,939, filed Mar. 13, 2013, entitled "Interactive Dashboard Based on Real-Time Sentiment Analysis for Synchronous Communication", invented by Fink, P.W., K.E. McNeil, P.E. Parker, and D.B. Werts, Total 51 pp. [57.307 (Appln)].

IBM Corp., "A Method to Warn Users of Being Emotional in Email/Chat Before Sending", Technical Disclosure, Jul. 24, 2008, IP.com No. IPCOM000173016D, Total 2 pp.

IBM Corp., "Method and System for E-mail Tone Sensing and Adjustment", Technical Disclosure, Sep. 12, 2008, IP.com No. IPCOM000174540D, Total 3 pp.

Lymbix Inc., "ToneCheck", [online], [Retrieved on Jun. 8, 2012]. Retrieved from the Internet at <URL: http://www.lymbix.com/>, Lymbix Inc., © 2009-2011, Total 4 pp.

Ma, C., A. Osherenko, H. Prendinger, and M. Ishizuka, "A Chat System Based on Emotion Estimation from Text and Embodied Conversational Messengers", (Preliminary Report), IEEE, 2005 Total 3 pp (Also pp. 546-548).

Mashable, Inc., "How a Sentiment Analysis Startup Profits by Checking in E-mail", [online], [Retrieved on Jun. 8, 2012]. Retrieved from the Internet at <URL: http://mashable.com/2011101/20/lymbix/>, Total 13 pp.

"Text Tone Switching Method", Jan. 14, 2011, IP.com No. IPCOM000203011D, Technical Disclosure, Total 4 pp.

Kumar et al., "Method and System for Dynamically Presenting Contents Based on Sentiment of User", IPCOM000211505, Oct. 7, 2011, 2 Pages, IP.com. [Also Total 3 pp.].

Wikipedia, "Sentiment Analysis", [Retrieved on Nov. 13, 2012]. Retrieved from the Internet at <URL: http://en.wikipedia.org/wiki/Sentiment_analysis>, Total 4 pp.

U.S. Appl. No. 13/728,898, filed Dec. 27, 2012, entitled "Real-Time Sentiment Analysis for Synchronous Communication", invented by Fink, P.W., K.E. McNeil, P.E. Parker, and D.B. Werts, Total 39 pp. [54.95 (Appln)].

Office Action 1, Oct. 17, 2014, for U.S. Appl. No. 13/728,898, filed Dec. 27, 2012 by P.W. Fink et al., Total 21 pp. [54.95 (OA1)].

Response to Office Action 1, Jan. 20, 2015, for U.S. Appl. No. 13/728,898, filed Dec. 27, 2012 by P. W. Fink et al., Total 10 pp. [54.95 (ROA1)].

Final Office Action, Apr. 28, 2015, for U.S. Appl. No. 13/728,898, filed Dec. 27, 2012 by P.W. Fink et al., Total 14 pp. [54.95 (FAO)].

Office Action 1, Jan. 16, 2015, for U.S. Appl. No. 13/799,939, filed Mar. 13, 2013 by P.W. Fink et al., Total 16 pp. [57.307 (OA1)].

Response to Office Action 1, Apr. 10, 2015, for U.S. Appl. No. 13/799,939, filed Mar. 13, 2013 by P.W. Fink et al., Total 11 pp. [57.307 (ROA1)].

Office Action 3, Feb. 11, 2016, for U.S. Appl. No. 13/728,898, filed Dec. 27, 2012 by P.W. Fink et al., Total 18 pp. [54.95 (OA3)].

Notice of Allowance, Jul. 31, 2015, for U.S. Appl. No. 13/799,939, filed Mar. 13, 2013 by P.W. Fink et al., Total 13 pp. [57.307 (NOA)].

Response to Office Action 3, May 10, 2016, for U.S. Appl. No. 13/728,898, filed Dec. 27, 2012 by P.W. Fink et al., Total 10 pp. [54.95 (ROA)].

Notice of Allowance 2, Mar. 11, 2016, for U.S. Appl. No. 13/799,939, filed Mar. 13, 2013 by P.W. Fink et al., Total 17 pp. [57.307 (NOA2)].

Notice of Allowance 3, Jun. 15, 2016, for U.S. Appl. No. 13/799,939, filed Mar. 13, 2013 by P.W. Fink et al., Total 7 pp. [57.307 (NOA3)].

Mell, P. and T. Grance, "The NIST Definition of Cloud Computing (Draft)", Jan. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Sabita Barik et al.; "Discovery using Fuzzy FP-growth Algorithm from Gene Expression Data"; International Journal of Advanced Computer Science and Applications (IJACSA), vol. 1, No. 5, Nov. 2010; Publisher: Institute of Technical Education and Research, India, Total 6 pp.

English Abstract & Translation for JP2004030093A, published Jan. 29, 2004, Total 18 pp.

Preliminary Amendment, dated Sep. 20, 2012, for U.S. Appl. No. 13/541,475, filed Jul. 3, 2012, entitled, "Using Annotators in Genome Research", invented by Stephan D. Bowman et al., pp. 1-13.

(56) References Cited

OTHER PUBLICATIONS

Preliminary Amendment, dated May 2, 2013, for U.S. Appl. No. 13/541,475, filed Jul. 3, 2012, entitled, "Using Annotators in Genome Research", invented by Stephan D. Bowman et al., pp. 1-5.
Office Action, dated Feb. 27, 2014, for U.S. Appl. No. 13/541,475, filed Jul. 3, 2012, entitled, "Using Annotators in Genome Research", invented by Stephen D. Bowman et al., Total 12 pages.
Response to Office Action, dated May 27, 2014, for U.S. Appl. No. 13/541,475, filed Jul. 3, 2012, entitled, "Using Annotators in Genome Research", invented by Stephen D. Bowman et al., Total 15 pages.
Final Office Action, dated Aug. 20, 2014, for U.S. Appl. No. 13/541,475, filed Jul. 3, 2012, invented by Stephen D. Bowman et al., Total 19 pages.
Response to Final Office Action, dated Nov. 20, 2014, for U.S. Appl. No. 13/541,475, filed Jul. 3, 2012, invented by Stephen D. Bowman et al., Total 13 pages.
Office Action, dated Dec. 15, 2014, for U.S. Appl. No. 13/541,475, filed Jul. 3, 2012, invented by Stephen D. Bowman et al., Total 21 pages.
Response to Office Action, dated Mar. 18, 2015, for U.S. Appl. No. 13/541,475, filed Jul. 3, 2012, invented by Stephen D. Bowman et al., Total 10 pages.
Notice of Allowance, dated Apr. 6, 2015, for U.S. Appl. No. 13/541,475, filed Jul. 3, 2012, invented by Stephen D. Bowman et al., Total 10 pages.
Preliminary Remarks, dated May 2, 2013, for U.S. Appl. No. 13/875,713, filed May 2, 2013, entitled, "Using Annotators in Genome Research", invented by Stephen D. Bowman et al., Total 2 pages.
Office Action, dated Feb. 28, 2014, for U.S. Appl. No. 13/875,713, filed May 2, 2013, entitled, "Using Annotators in Genome Research", invented by Stephen D. Bowman et al., Total 21 pages.
Response to Office Action, dated May 27, 2014, for U.S. Appl. No. 13/875,713, filed May 2, 2013, entitled, "Using Annotators in Genome Research", invented by Stephen D. Bowman et al., Total 13 pages.
Final Office Action, dated Aug. 21, 2014, for U.S. Appl. No. 13/875,713, filed May 2, 2013, invented by Stephen D. Bowman et al., Total 21 pages.
Response to Final Office Action, dated Nov. 20, 2014, for U.S. Appl. No. 13/875,713, filed May 2, 2013, invented by Stephen D. Bowman et al., Total 12 pages.
Office Action, dated Dec. 15, 2014, for U.S. Appl. No. 13/875,713, filed May 2, 2013, invented by Stephen D. Bowman et al., Total 22 pages.
Response to Office Action, dated Mar. 18, 2015, for U.S. Appl. No. 13/875,713, filed May 2, 2013, invented by Stephen D. Bowman et al., Total 8 pages.
Notice of Allowance, dated Apr. 6, 2015, for U.S. Appl. No. 13/875,713, filed May 2, 2013, invented by Stephen D. Bowman et al., Total 10 pages.
Response to Final Office Action, dated Jul. 28, 2015, for U.S. Appl. No. 13/728,898, filed Dec. 27, 2012, invented by P.W. Fink et al., Total 11 pp.
English Google Translation for CN102385858, published on Jun. 5, 2013, Total 14 pp.
Kano, Y., M. Miwa, K.B. Cohen, L.E. Hunter, S. Ananiadou, and J. Tsujii, "U-Compare: A Modular NLP Workflow Construction and Evaluation System", © 2011 International Business Machines Corporation, IBM J. Res. & Dev. vol. 55, No. 3, Paper 11, May/Jun. 2011, Total 10 pp.
Final Office Action 2, Aug. 19, 2016, for U.S. Appl. No. 13/728,898, filed Dec. 27, 2012 by P.W. Fink et al., Total 18 pp. [54.95 (FOA2)].
Response to Final Office Action 2, Oct. 17, 2016, for U.S. Appl. No. 13/728,898, filed Dec. 27, 2012 by P.W. Fink et al., Total 10 pp. [54.95 (RFOA2)].
Notice of Allowance, Oct. 31, 2016, for U.S. Appl. No. 13/728,898, filed Dec. 27, 2012 by P.W. Fink et al., Total 13 pp. [54.95 (NOA)].
Notice of Allowance 2, Feb. 24, 2017, for U.S. Appl. No. 13/728,898, filed on Dec. 27, 2012 by P.W. Fink et al., Total 13 pp. [54.95 (NOA2)].

\* cited by examiner

REAL-TIME MESSAGE SENTIMENT AWARENESS

FIELD

Embodiments of the invention relate to real-time message sentiment awareness.

BACKGROUND

Electronic messages, such as electronic mail (email) and instant messages are commonly used for communication. Because such communication is not face to face communication, the recipient who is reading the electronic message does not have a way to know the sender's body language or tone. Therefore, it is possible that the tone of the message may be misunderstood by the recipient. For example, if the sender is in a bad mood, then the sender may write a rude electronic message without intending to do so (e.g., because the sender had a fight with a co-worker, the sender responds rudely to a customer issue). It is also possible that the sender does not convey importance or urgency of a message (e.g., a customer is sending an electronic message about an important problem with a product, and the customer did not write the electronic message aggressively enough to get instant attention).

SUMMARY

Provided are a method, computer program product, and system for determining a sentiment of an electronic message. The electronic message is parsed to identify one or more sub-constructs. For at least one of the sub-constructs that is not false-positive, a sentiment indicator is assigned from a set of types of sentiment indicators, and a score is assigned for the sentiment indicator. A final score is obtained for at least one type of sentiment indicator in the electronic message by summing scores for that type of sentiment indicator. Based on the final score for the at least one type of sentiment indicator, a sentiment of the electronic message is identified.

BRIEF DESCRIPTION OF THE SEVERAL VIEWS OF THE DRAWINGS

Referring now to the drawings in which like reference numbers represent corresponding parts throughout:

FIG. 6 is formed by FIG. 6A and FIG. 6B.

DETAILED DESCRIPTION

Figure 1:
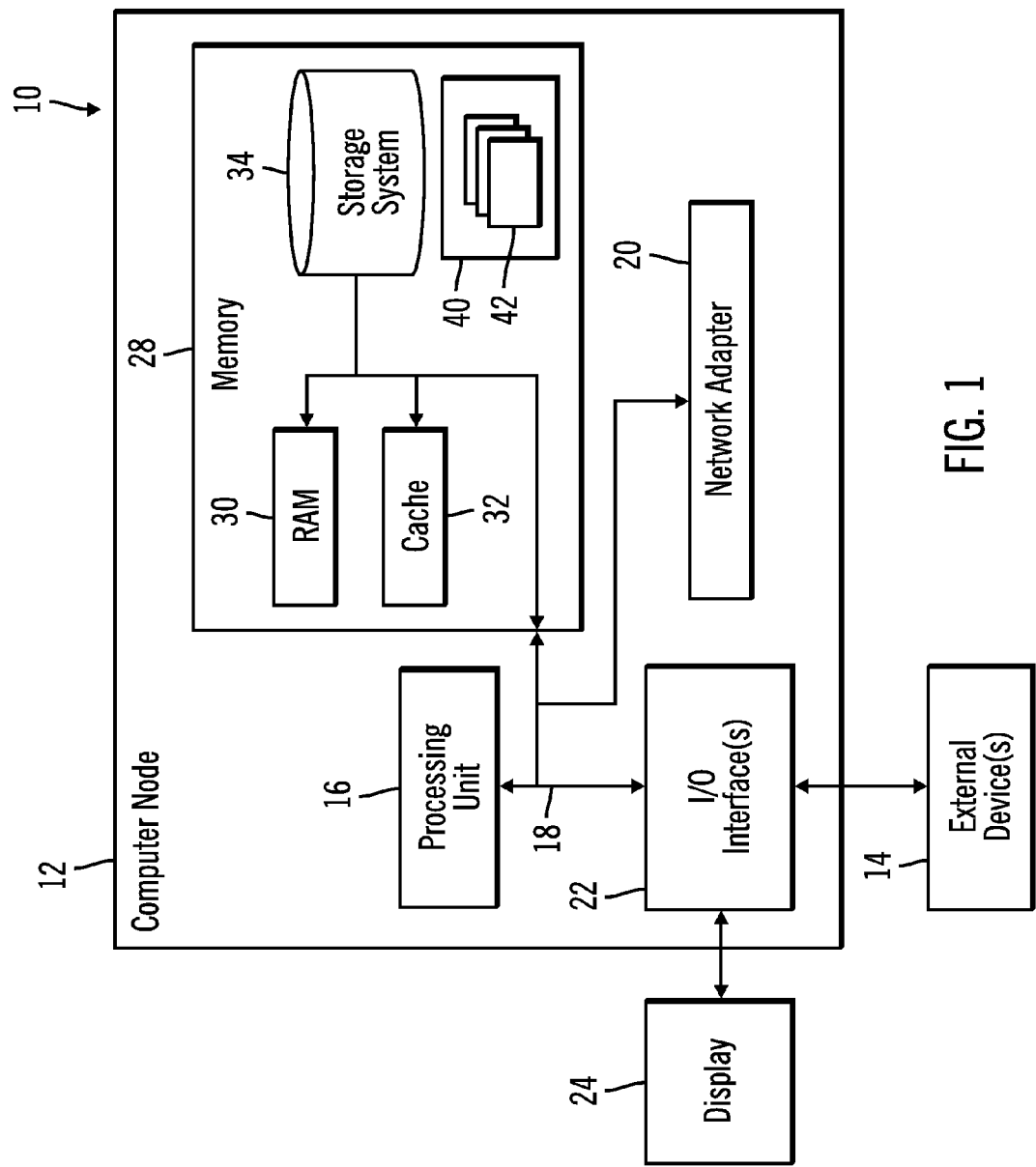
FIG. 1 depicts a cloud computing node in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
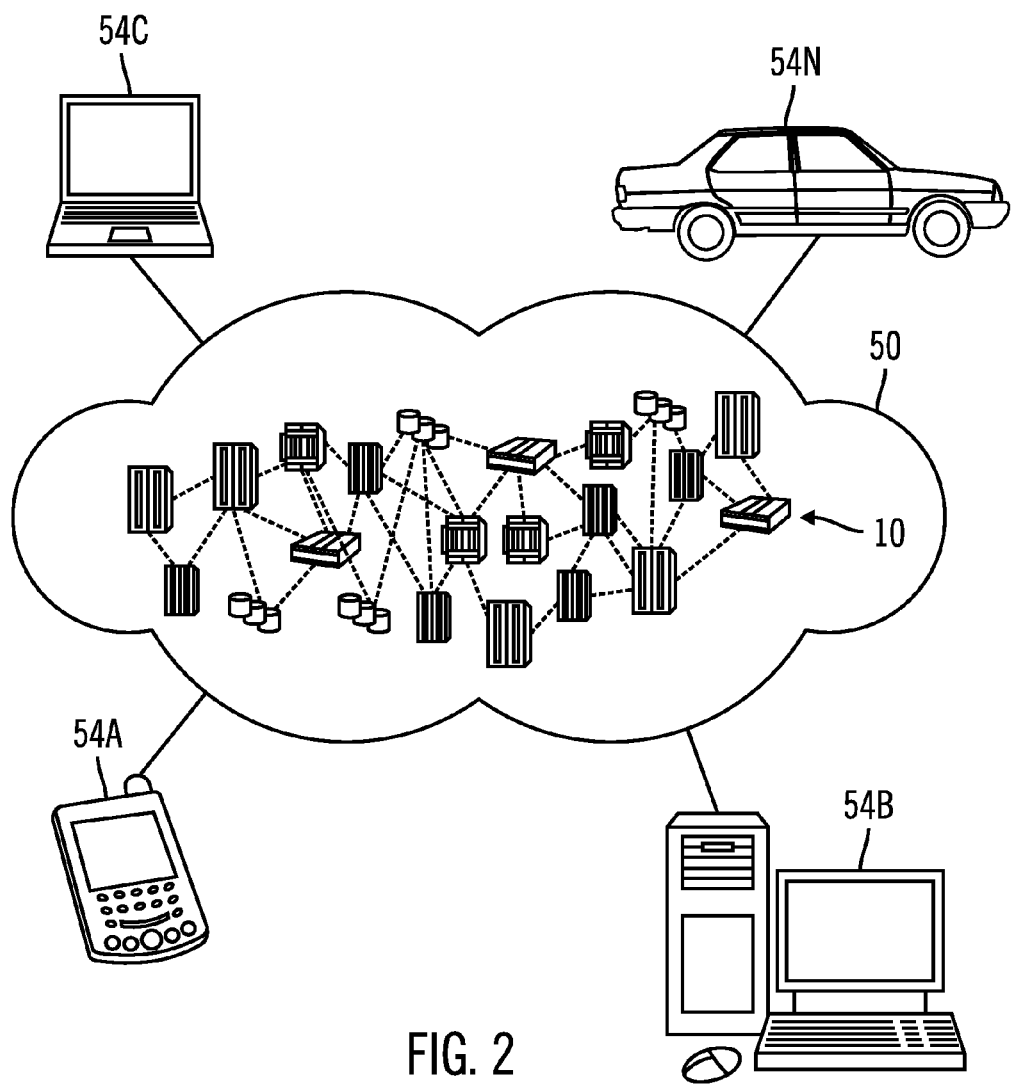
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
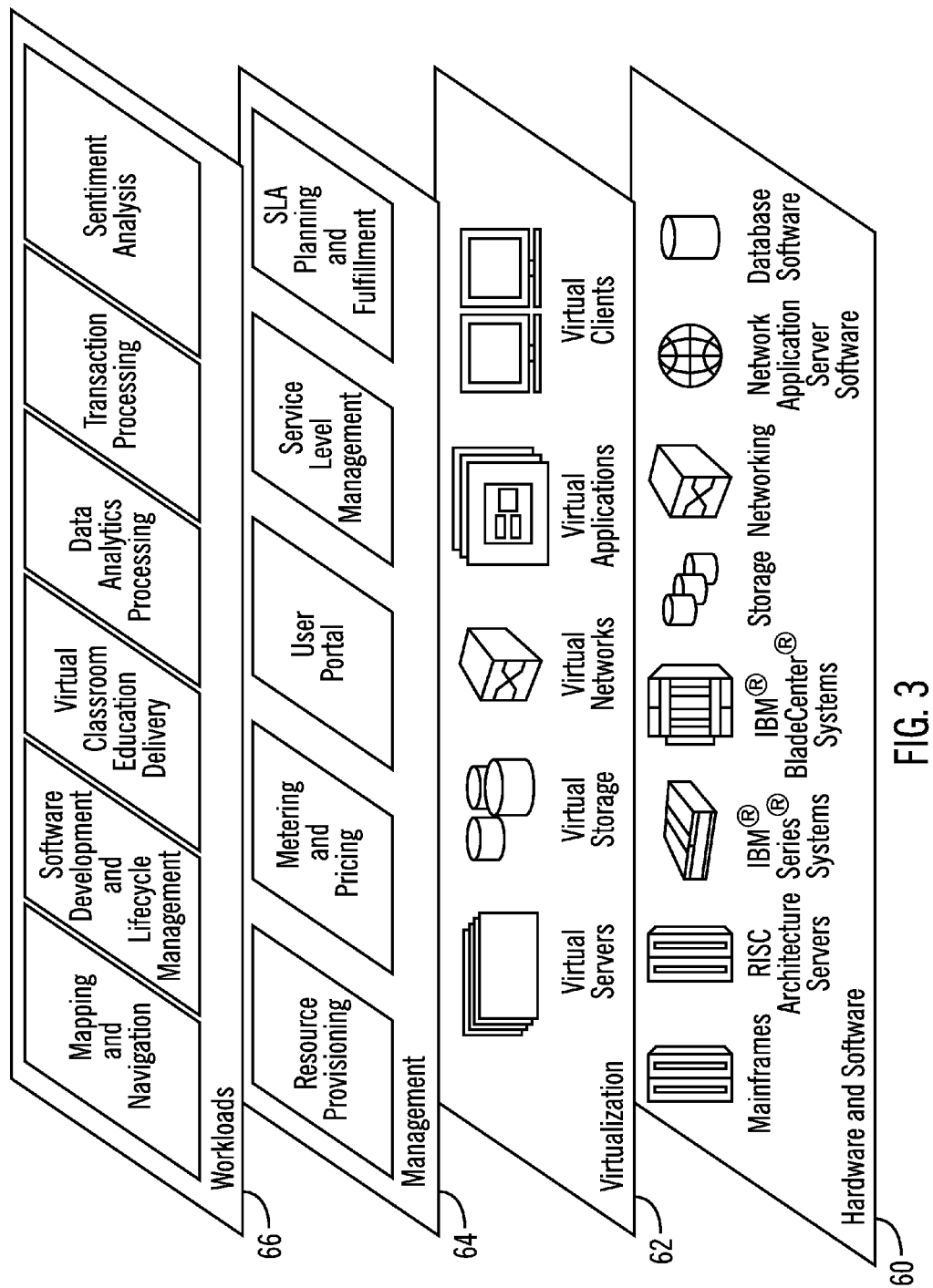
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sentiment analysis.

Thus, in certain embodiments, software, implementing sentiment analysis in accordance with embodiments described herein, is provided as a service in a cloud environment.

Figure 4:
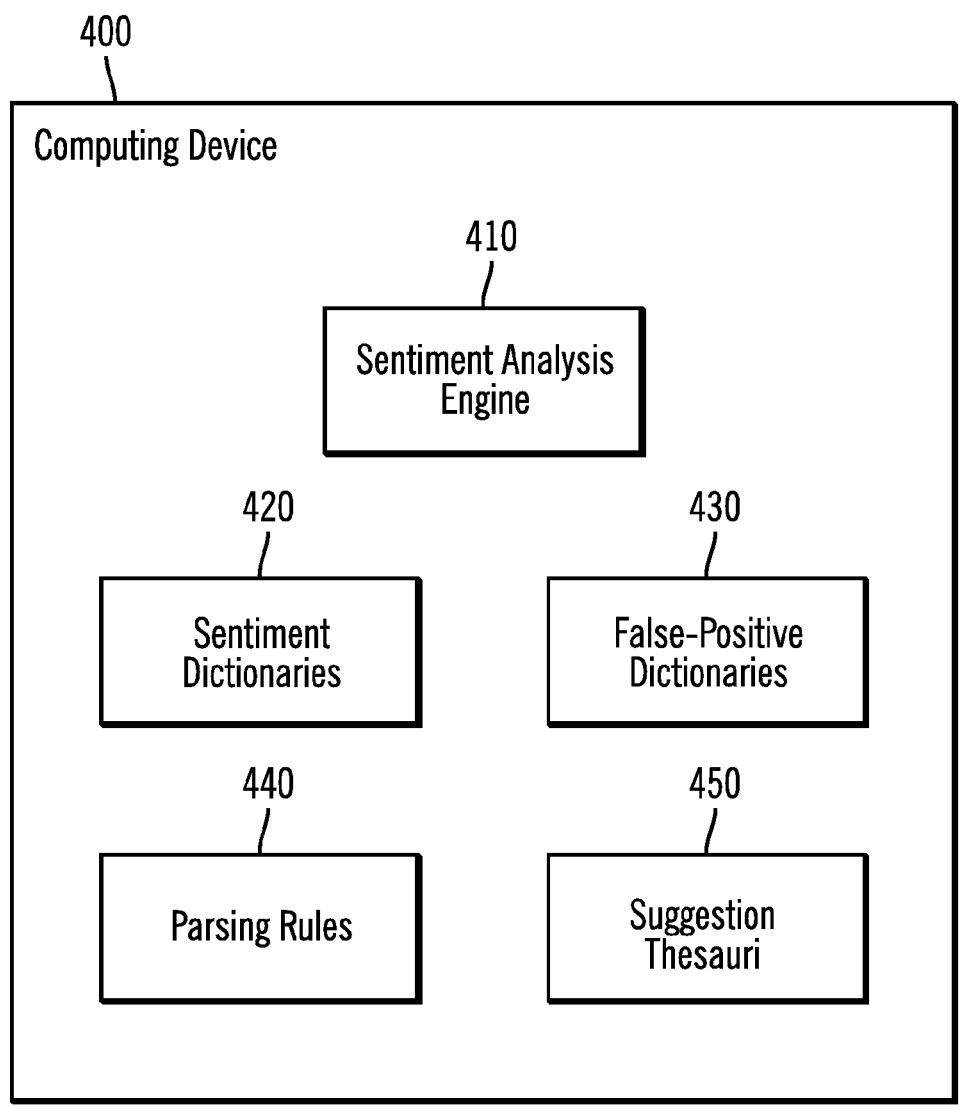
FIG. 4 illustrates a computing environment in accordance with certain embodiments.

FIG. 4 illustrates a computing environment in accordance with certain embodiments. A computing device 400 includes a sentiment analysis engine 410, one or more sentiment dictionaries 420, one or more false-positive dictionaries 430, one or more parsing rules 440, and one or more suggestion thesauri 450.

The sentiment analysis engine 410 analyzes the sentiment (e.g., polite, aggressive, neutral, etc.) of an electronic message using the one or more dictionaries 420 and the one or more parsing rules 440.

A sub-construct may be described as a portion of the electronic message. In certain embodiments, sub-constructs may be tokens, words, phrases, sentences, paragraphs, etc. In certain embodiments, a sub-construct is the entire electronic message.

In certain embodiments, the sentiment dictionaries 420 are available for each type of sentiment. Each sentiment dictionary 420 may include sub-constructs classified as that sentiment. In certain embodiments, each sub-construct in the sentiment dictionaries 420 may have an associated score representing an intensity of the sentiment.

For a polite sentiment dictionary 420, a score may indicate that a sub-construct is a little polite (e.g., 1) or very polite (e.g., 3). For example, a polite sentiment dictionary 420 may include polite sub-constructs and scores, such as:
apologize, score=2
please, score=1
thank you, score=2

For an aggressive sentiment dictionary 420, a score may indicate that a sub-construct is a little aggressive (e.g., 1) or very aggressive (e.g., 3). The aggressive sentiment dictionary 420 may include aggressive sub-constructs, such as:
damn, score=2
idiot, score=3
stupid, score=3.

Also, an extreme sentiment dictionary 420 may include sub-constructs indicating additional feeling, such as: very much, score=3.

In certain embodiments, the false-positive dictionaries 430 are available for each type of sentiment. Each false-positive dictionary 430 includes sub-constructs that may be incorrectly classified as that sentiment. For example, a polite false-positive dictionary 430 may include sub-constructs such as "Welcome Hotel". As another example, an aggressive false-positive dictionary 430 may include sub-constructs such as: "angry tomatoes" (which may refer to a game rather than someone who is angry).

In certain embodiments, the suggestion thesauri 450 may include synonyms for sub-constructs, along with an indication of the sentiment and an associated score representing an intensity of the sentiment. The following are examples of sub-constructs in a suggestion thesauri 450:
good→polite, score=1
great→polite, score=2
excellent→polite, score=3

Figure 5:
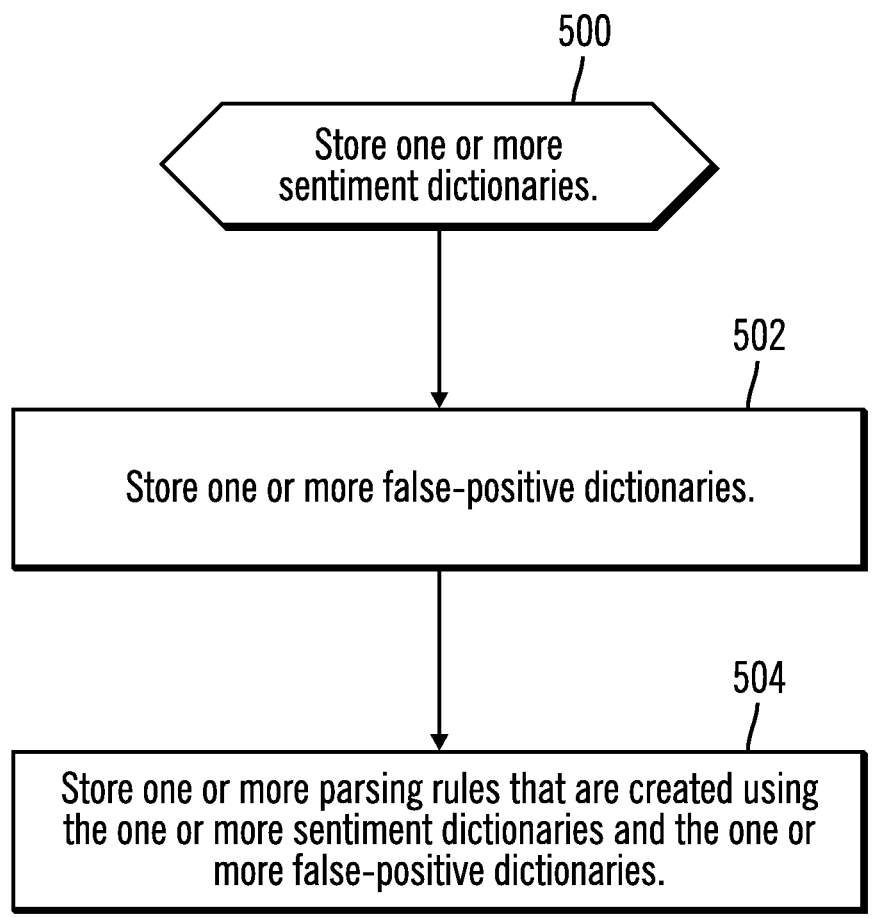
FIG. 5 illustrates, in a flow diagram, operations for creating parsing rules in accordance with certain embodiments.

FIG. 5 illustrates, in a flow diagram, operations for creating parsing rules in accordance with certain embodiments. Control begins in block 500 with the sentiment analysis engine 410 storing one or more sentiment dictionaries 420. In certain embodiments the one or more sentiment dictionaries 420 are created by a user using Unstructured Information Management Architecture (UIMA). In block 502, the sentiment analysis engine 410 stores one or more false-positive dictionaries 430. In certain embodiments the one or more false-positive dictionaries 430 are created by a user using Unstructured Information Management Architecture (UIMA). In block 504, the sentiment analysis engine 410 stores one or more parsing rules 440 that are created using the sentiment dictionaries 420 and the false-positive dictionaries 430. In certain embodiments the one or parsing rules 440 are created by a user using Unstructured Information Management Architecture (UIMA). An example of a parsing rule is:
If "thank you" is followed by "very much", then the sentiment is level 2 polite.

In the above example, "thank you" is a word from a polite sentiment dictionary, while "very much" is a word from an extreme sentiment dictionary. Also, the type of sentiment assigned is "polite", and the score assigned is "2". Because each parsing rule identifies one or more sub-constructs (e.g., "thank you" and "very much"), a sentiment type (e.g., polite), and a score (e.g., "2"), the parsing rules may be used to parse an electronic message to identify one or more sub-constructs, and, for each of the sub-constructs that are not false-positive, the parsing rules may be used to assign a sentiment indicator from a set of types of sentiment indicators and to assign a score for the sentiment indicator.

In certain embodiments, the parsing rules take into account whether a word is a noun, verb, adjective, etc.

The sentiment analysis engine 410 uses the parsing rules 440 to analyze the unstructured text in the message and annotates the text according to the parsing rules.

In certain embodiments, the computing device 400 has the architecture of computing node 10. In certain embodiments, the computing device 400 is part of a cloud environment. In certain alternative embodiments, the computing device 400 is not part of a cloud environment.

Figure 6A:
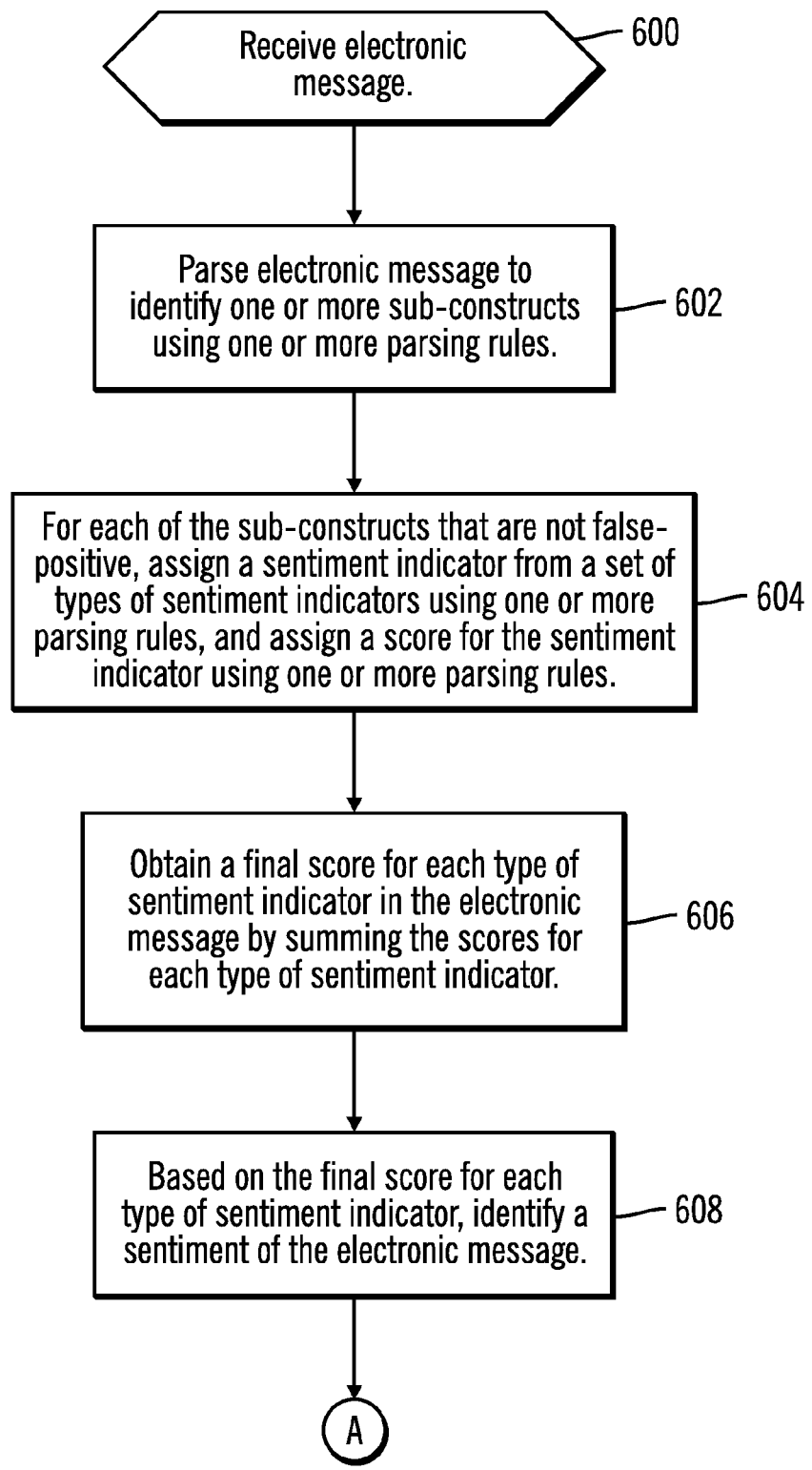
FIG. 6 illustrates, in a flow diagram, operations for determining the sentiment of a message in accordance with certain embodiments.
Figure 6B:
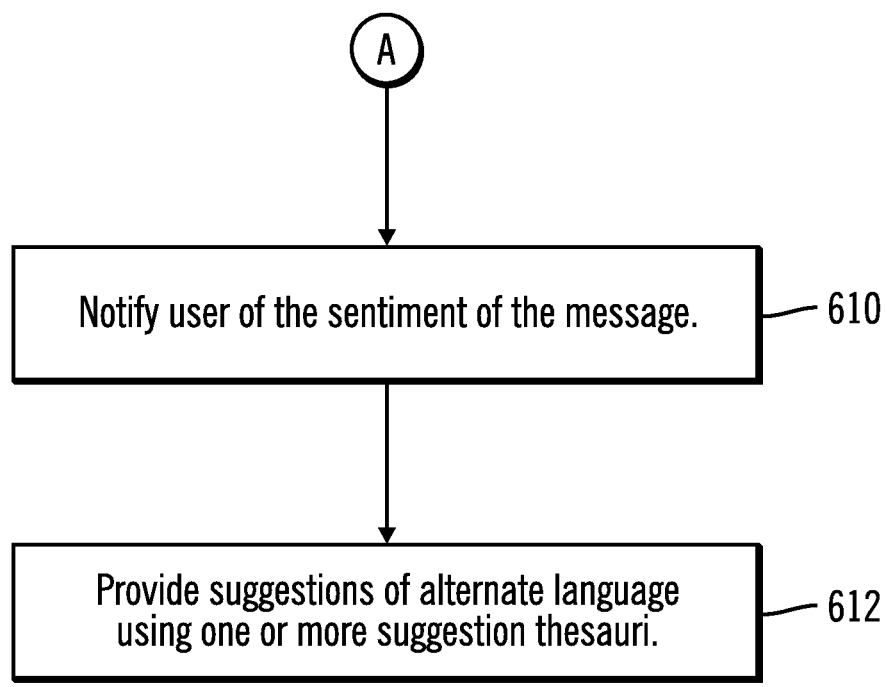

FIG. 6 illustrates, in a flow diagram, operations for determining the sentiment of a message in accordance with certain embodiments. FIG. 6 is formed by FIG. 6A and FIG. 6B. In certain embodiments, the processing of FIG. 6 (blocks 600-612) occurs in real-time. Control begins at block 600 with the sentiment analysis engine 410 receiving an electronic message. In certain embodiments, when a sender has prepared an electronic message, the sender may select a user interface element (e.g., a button or menu selection) to indicate that the user wants the sentiment of the electronic message to be determined before the user sends the electronic message. In certain embodiments, the recipient of a message can also select a user interface element (e.g., a button or menu selection) to indicate that the recipient wants the sentiment of the electronic message to be determined. This may assist the recipient in understanding the mood of the sender.

In block 602, the sentiment analysis engine 410 parses the electronic message to identify one or more sub-constructs using one or more parsing rules.

In block 604, the sentiment analysis engine 410, for each of the sub-constructs that are not false-positive, assigns a sentiment indicator from a set of types of sentiment indicators (e.g., polite, aggressive, neutral) using the one or more parsing rules, and assigns a score for the sentiment indicator using the one or more parsing rules. In certain embodiments, the sentiment analysis engine 410 identifies sub-constructs that are not false-positive using the one or more false-positive dictionaries. In certain embodiments, the sentiment analysis engine 410 does not count a false-positive in the scoring. For example, as in the "angry tomatoes" example, the sentiment analysis engine 410 does not consider the word angry as aggressive as it is a false-positive and is excluded from the scoring.

In certain embodiments, the score ranges from 1-3 and represents an intensity for each type of sentiment indicator. In certain embodiments, a score of 1 represents less sentiment, while a score of 3 represents more sentiment. For example, a score of 1 is less polite than a score of 3 for the polite sentiment. As another example, a score of 1 is less aggressive than a score of 3 for the aggressive sentiment. In certain embodiments, the sentiment analysis engine 410 determines how expressive a sentiment in a message is based on a score given to a sub-construct in the sentiment dictionaries 420. For example, the sentiment analysis engine 410 determines how aggressive a message is (e.g., very aggressive or a little bit aggressive) based on scores associated with sub-constructs in the sentiment dictionaries 420.

In certain embodiments sub-constructs are highlighted based on their score. For example, aggressive words may be highlighted from lighter red color to a darker red color as the score increases. As another example, polite sub-constructs may be highlighted from a light blue color to a darker blue color as score increases.

In addition, the parsing rules may also add score to the sub-construct. For example, "Thank you" may be polite, but according to a parsing rule, if "Thank you" is followed by "very much" (i.e., "Thank you very much"), then the sub-construct is more polite and is given a higher score.

Also, a polite sub-construct may be treated as an aggressive sub-construct. For example, in the sentence "I am not happy with the test results", the polite word ("happy") is negated ("not"), so, although "happy" may be in the polite sentiment dictionary 240, "not happy" may be considered as aggressive.

The following are examples of different sub-constructs with assigned sentiment indicators and scores:
I do not like your customer service, and your product is not great for such a high price. (Sentiment Indicator: Aggressive, Score 1)
I hate your customer service, and your product is terrible for such a high price. (Sentiment Indicator: Aggressive, Score 2)
I really hate your customer service, and your product is extremely terrible for such a high price. (Sentiment Indicator: Aggressive, Score 3)
I did not have a good experience with your customer service, and your product is OK for such a high price. (Sentiment Indicator: Polite, Score 1)

In block 606, the sentiment analysis engine 410 obtains a final score for each type of sentiment indicator in the electronic message by summing the scores for each type of sentiment indicator. In block 608, the sentiment analysis engine 410, based on the final score for each type of sentiment indicator, identifies a sentiment of the electronic message. For example, if the final score of polite sub-constructs are greater than the final score of aggressive or neutral sub-constructs, the sentiment analysis engine 410 determines that the electronic message is polite. Similarly, if the final score of aggressive sub-constructs are greater than the final score of polite or neutral sub-constructs, the sentiment analysis engine 410 determines that the electronic message is aggressive. In certain embodiments, none of the sub-constructs are assigned a "neutral" sentiment indicator, and, if the final score of polite sub-constructs is equal to the final score of aggressive sub-constructs, the sentiment analysis engine 410 determines that the electronic message is neutral. From block 608 (FIG. 6A), processing continues to block 610 (FIG. 6B).

In block 610, the sentiment analysis engine 410 notifies the user (i.e., the sender or recipient who requested the determination of sentiment) of the sentiment of the message. In certain embodiments, the sentiment analysis engine 410 displays the determined sentiment using text (e.g., "aggressive", "polite" or "neutral") or using an avatar or emoticon (e.g., an angry face icon to represent aggressiveness, a happy face to represent politeness, and another face to represent neutrality) to make the user aware of the sentiment of the electronic message. For a sender, this will make sender aware of the sentiment of message before the sender sends the electronic message. For a recipient, this will assist the recipient understand the mood of the sender.

In block 612, the sentiment analysis engine 410 provides suggestions of alternate language using the one or more suggestion thesauri 450. In certain embodiments, the sentiment analysis engine 410 provides the suggestion thesauri 450. In certain embodiments, the user (i.e., the sender or recipient who requested the determination of sentiment) may select a sub-construct (e.g., highlight the sub-construct), and the sentiment analysis engine 410 provides suggested language for different sentiments (e.g., alternate language that is polite, aggressive or neutral). For a sender, the sender may then modify the message with the alternate language. For a recipient, the recipient learns (for future electronic messages to be sent) how to word messages to get a particular sentiment across.

Thus, if the sender knows the sentiment of the electronic message prior to sending that electronic message, then, the sender can revise the electronic message to reflect the actual sentiment that the sender intends. For example, the sender is able to avoid sending a rude message to unintended recipients (e.g., to customer for friends and family). Also, a recipient better understands a received electronic message to, for example, provide better customer service or a better response.

In certain embodiments, the sentiment analysis engine 410 identifies sub-constructs in a message that correspond to sentiment sub-constructs stored in the sentiment dictionaries 420, and uses parsing rules to identify sub-constructs that may increase or diminish the dictionary-stored sentiment score.

Thus, the sentiment analysis engine 410 uses the sentiment dictionaries 420 to provide a real-time indication of the sentiment of sub-constructs in a message, along with a measure of the intensity of the sentiment. The sentiment analysis engine 410 uses the sentiment thesauri 450 to provide suggestions to the user for replacing identified sentiment sub-constructs with other sub-constructs to better conform to a sentiment target specified by the user.

Sometimes it is difficult for people from different cultures or countries to find appropriate sub-constructs in messages to each other. With embodiments, after sub-constructs are highlighted according to scores representing sentiments, the user receives suggestions to replace sub-constructs (e.g., with less/more aggressive/polite synonyms). In certain embodiments, the sentiment analysis engine 410 uses the suggestions thesauri 450 to provide suggestions along with scores for the sub-constructs and an indication of the sentiment of the sub-constructs.

For example, if a user writes "That is a really bad idea", the sentiment analysis engine 410 may highlight the sub-construct "really bad" with dark red (as it is aggressive) and display a score of 3. Then, the sentiment analysis engine 410 may provide suggestions (e.g., in two main categories: aggressive and polite, with scores for the suggestions). So, for the aggressive category, the sentiment analysis engine 410 might provide suggestions with score of 2 that removes "really" to reduce the intensity (i.e., "That is a bad idea") and suggestions with score of 1 to add "fooling" (i.e., "That is a really bad and foolish idea"). For the polite category, the sentiment analysis engine 410 may provide suggestions with a score of 1 to change "really bad" to "not exactly great" (i.e., "That is not exactly a great idea").

The sentiment analysis engine 410 analyzes the sentiment of an electronic message as the electronic message is being written to provide feedback for the general feeling of the message. The sentiment analysis engine 410 enables creation of sentiment dictionaries 420 of polite and aggressive words and phrases, and enables creation of false-positive dictionaries 420 of false positive words and phrases for polite and aggressive phrases. The sentiment analysis engine 410 parses the electronic message using the defined dictionaries 420, 430 to tabulate the number of aggressive and polite phrases minus the false positives. The sentiment analysis engine 410 represents the sentiment of the electronic message to the user through visually based on the message analysis. The sentiment analysis engine 410 also provides suggestions (using the one or more suggestion thesauri 450) for replacing identified sentiment words and/or phrases with other words and/or phrases to better conform to a sentiment desired by the user when user is actually writing the electronic message.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for determining a sentiment of an electronic message, comprising:
   providing, using a processor of a computer, sentiment dictionaries and false-positive dictionaries with associated sentiment indicators, wherein a sentiment dictionary and a false-positive dictionary are provided for each type of sentiment, wherein the sentiment dictionary includes sub-constructs that are correctly classified as the associated sentiment indicator, and wherein the false-positive dictionary includes sub-constructs that are incorrectly classified as the associated sentiment indicator;
   parsing the electronic message to identify one or more sub-constructs;
   finding a first sub-construct of the one or more sub-constructs in a false-positive dictionary from the false-positive dictionaries that indicates that the first sub-construct is incorrectly classified as the associated sentiment indicator of the false-positive dictionary;
   for each of the one or more sub-constructs, other than the first sub-construct, that are not found in the false-positive dictionaries,
      finding that sub-construct in a sentiment dictionary from the sentiment dictionaries;
      assigning a score for the associated sentiment indicator; and
      applying a rule that includes the sub-construct and another sub-construct from the one or more sub-constructs to adjust the score;
   obtaining a final score for each type of sentiment indicator in the electronic message by summing scores for sub-constructs having been assigned the score for that type of sentiment indicator without counting the first sub-construct that has been found in the false-positive dictionary; and
   based on the final score for each type of sentiment indicator, identifying the sentiment of the electronic message.

2. The method of claim 1, wherein software is provided as a service in a cloud environment.

3. The method of claim 1, wherein one or more parsing rules are used to parse the electronic message and assign the score.

4. The method of claim 1, further comprising:
   notifying a user of the sentiment by providing an emoticon representing the sentiment.

5. The method of claim 1, further comprising:
   notifying a user of the sentiment by providing text describing the sentiment.

6. The method of claim 1, further comprising:
   providing suggestions of alternate language using one or more suggestion thesauri.

7. The method of claim 1, further comprising:
   storing the sentiment dictionaries and the false-positive dictionaries.

8. The method of claim 1, further comprising:
   storing one or more parsing rules that are created using the sentiment dictionaries and the false-positive dictionaries.

9. A computer system for determining a sentiment of an electronic message, comprising:
  a processor; and
  a storage device connected to the processor, wherein the storage device has stored thereon a program, and wherein the processor is configured to execute instructions of the program to perform operations, wherein the operations comprise:
  providing sentiment dictionaries and false-positive dictionaries with associated sentiment indicators, wherein a sentiment dictionary and a false-positive dictionary are provided for each type of sentiment, wherein the sentiment dictionary includes sub-constructs that are correctly classified as the associated sentiment indicator, and wherein the false-positive dictionary includes sub-constructs that are incorrectly classified as the associated sentiment indicator;
  parsing the electronic message to identify one or more sub-constructs;
  finding a first sub-construct of the one or more sub-constructs in a false-positive dictionary from the false-positive dictionaries that indicates that the first sub-construct is incorrectly classified as the associated sentiment indicator of the false-positive dictionary;
  for each of the one or more sub-constructs, other than the first sub-construct, that are not found in the false-positive dictionaries
    finding that sub-construct in a sentiment dictionary from the sentiment dictionaries;
    assigning a score for the associated sentiment indicator; and
    applying a rule that includes the sub-construct and another sub-construct from the one or more sub-constructs to adjust the score;
  obtaining a final score for each type of sentiment indicator in the electronic message by summing scores for sub-constructs having been assigned the score for that type of sentiment indicator without counting the first sub-construct that has been found in the false-positive dictionary; and
  based on the final score for each type of sentiment indicator, identifying the sentiment of the electronic message.

10. The computer system of claim 9, wherein one or more parsing rules are used to parse the electronic message and assign the score.

11. The computer system of claim 9, wherein the operations further comprise:
  notifying a user of the sentiment by providing an emoticon representing the sentiment.

12. The computer system of claim 9, wherein the operations further comprise:
  notifying a user of the sentiment by providing text describing the sentiment.

13. The computer system of claim 9, wherein the operations further comprise:
  providing suggestions of alternate language using one or more suggestion thesauri.

14. The computer system of claim 9, wherein the operations further comprise:
  storing the sentiment dictionaries and the false-positive dictionaries.

15. The computer system of claim 9, wherein the operations further comprise:
  storing the or more parsing rules that are created using the sentiment dictionaries and the false-positive dictionaries.

16. The computer system of claim 9, wherein the program is provided as a service in a cloud environment.

17. A computer program product for determining a sentiment of an electronic message, the computer program product comprising:
  a non-transitory computer readable storage medium having computer readable program code embodied therewith, wherein the computer readable program code, when executed by a processor of a computer, is configured to perform:
  providing sentiment dictionaries and false-positive dictionaries with associated sentiment indicators, wherein a sentiment dictionary and a false-positive dictionary are provided for each type of sentiment, wherein the sentiment dictionary includes sub-constructs that are correctly classified as the associated sentiment indicator, and wherein the false-positive dictionary includes sub-constructs that are incorrectly classified as the associated sentiment indicator;
  parsing the electronic message to identify one or more sub-constructs;
  finding a first sub-construct of the one or more sub-constructs in a false-positive dictionary from the false-positive dictionaries that indicates that the first sub-construct is incorrectly classified as the associated sentiment indicator of the false-positive dictionary;
  for each of the one or more sub-constructs, other than the first sub-construct, that are not found in the false-positive dictionaries,
    finding that sub-construct in a sentiment dictionary from the sentiment dictionaries;
    assigning a score for the associated sentiment indicator; and
    applying a rule that includes the sub-construct and another sub-construct from the one or more sub-constructs to adjust the score;
  obtaining a final score for each type of sentiment indicator in the electronic message by summing scores for sub-constructs having been assigned the score for that type of sentiment indicator without counting the first sub-construct that has been found in the false-positive dictionary; and
  based on the final score for each type of sentiment indicator, identifying the sentiment of the electronic message.

18. The computer program product of claim 17, wherein one or more parsing rules are used to parse the electronic message and assign the score.

19. The computer program product of claim 17, wherein the computer readable program code, when executed by the processor of the computer, is configured to perform:
  notifying a user of the sentiment by providing an emoticon representing the sentiment.

20. The computer program product of claim 17, wherein the computer readable program code, when executed by the processor of the computer, is configured to perform:
  notifying a user of the sentiment by providing text describing the sentiment.

21. The computer program product of claim 17, wherein the computer readable program code, when executed by the processor of the computer, is configured to perform:
  providing suggestions of alternate language using one or more suggestion thesauri.

22. The computer program product of claim 17, wherein the computer readable program code, when executed by the processor of the computer, is configured to perform:

storing the sentiment dictionaries and the false-positive dictionaries.

23. The computer program product of claim 17, wherein the computer readable program code, when executed by the processor of the computer, is configured to perform:
storing one or more parsing rules that are created using the sentiment dictionaries and the false-positive dictionaries.

24. The computer program product of claim 17, wherein the computer readable program code is provided as a service in a cloud environment.

* * * * *